Sept. 27, 1966  W. DUBUSKER ET AL  3,275,794
APPARATUS FOR WELDING SHEET MATERIAL
Original Filed Nov. 20, 1961  4 Sheets-Sheet 1

INVENTORS
WILLIAM DUBUSKER
FRANK S. POGORZELSKI
CLEM W. FRIDRICH
BY Gravely, Lieder & Woodruff
ATTORNEYS Sept. 27, 1966   W. DUBUSKER ET AL   3,275,794
APPARATUS FOR WELDING SHEET MATERIAL
Original Filed Nov. 20, 1961   4 Sheets-Sheet 4

INVENTORS
WILLIAM DUBUSKER
FRANK S. POGORZELSKI
CLEM W. FRIDRICH
BY Gravely, Lieder & Woodruff
ATTORNEYS

United States Patent Office 3,275,794
Patented Sept. 27, 1966

3,275,794
APPARATUS FOR WELDING SHEET MATERIAL
William Dubusker, Creve Coeur, Frank S. Pogorzelski, Bellefontaine Neighbors, and Clem W. Fridrich, St. Ann, Mo., assignors to McDonnell Aircraft Corporation, St. Louis County, Mo., a corporation of Maryland
Continuation of application Ser. No. 153,624, Nov. 20, 1961. This application Nov. 6, 1963, Ser. No. 322,565
3 Claims. (Cl. 219—125)

The invention described herein was made in the performance of work under a NASA contract and is subject to the provisions of the National Aeronautics and Space Act of 1958, Public Law 85–568 (72 Stat. 426; 42 U.S.C. 2451), as amended.

The present invention relates to welding apparatus, and more specifically is a continuation of a previous application of the same inventors, Serial No. 153,624, filed November 20, 1961, now abandoned, directed to a welding apparatus and method for fusion butt welding adjacent edges of objects such as metal sheets and the like.

Many devices and methods for welding together the edges of metal sheets have been constructed and used in the past and many of the known devices and methods have also been employed for welding together adjacent lapped, as distinguished from butted edges. Furthermore, all known devices and methods for butt welding of metal sheets have produced inferior weld connections and this has been particularly true when used to weld relatively thin gage metal sheets. In this connection the known devices and methods have produced weld connections with weakened spots which are subject to cracking, rusting and other forms of deterioration, and furthermore, weld connections made heretofore have been relatively more subject to rupture and leakage especially under pressure than weld connections formed by the present invention. For these and other reasons the known means and methods of welding have been unsatisfactory, particularly for applications where the weld connection must be able to withstand relatively high pressures such as the pressures encountered in space and underwater environments. Still further, the known welding means and methods have produced uneven, non-smooth and non-uniform thickness weld connections and in many situations this in itself makes the connections unsatisfactory.

The subject means and apparatus for welding overcome these and other shortcomings and disadvantages of the known means and methods by providing improved means for supporting the members during welding and improved means for welding said members without requiring a filler material. Furthermore, the subject means and method produce smooth and uniform thickness weld connections which are able to withstand pressures of the same order of magnitude as the unwelded members themselves without rupturing, leaking or otherwise deteriorating. The subject weld connections are also suitable for use with many different metals including some metals which are ordinarily very difficult to weld even under the most ideal conditions. Still further, the present means and method of welding produces butt weld seams which are relatively less apt to be weakened by pitting, corrosion and the other usual forms of welding defects.

It is therefore a main object of the present invention to provide improved means and method for butt welding together edges of members such as metal sheets and the like.

Another object is to provide welding means and method which are well suited for welding even extremely thin metal sheets.

Another object is to provide improved means and method of fusion welding without using a filler material.

Another object is to expand the number and kinds of materials that can be welded together in sheet form.

Another object is to provide improved means for supporting members such as metal sheets while welding adjacent abutting edges together.

Another object is to provide improved means for chilling members during welding thereof.

Another object is to provide means for maintaining a welding instrument in proper positional relationship to the work during a seam welding operation.

Another object is to provide means for making smoother more uniform thickness weld seams between members such as metal sheets.

Another object is to provide seam welding means in which either the welding instrument or the work can be moved while the other remains stationary.

Yet another object is to provide welding means and method which are adaptable for welding linear as well as curvilinear or irregular seams.

Another object is to provide improved means for preparing edges or surfaces of members prior to welding.

These and other objects and advantages of the present invention will become apparent after considering the following specification wherein several preferred embodiments of the invention are described in conjunction with the accompanying drawings which form a part thereof.

Figure 1:
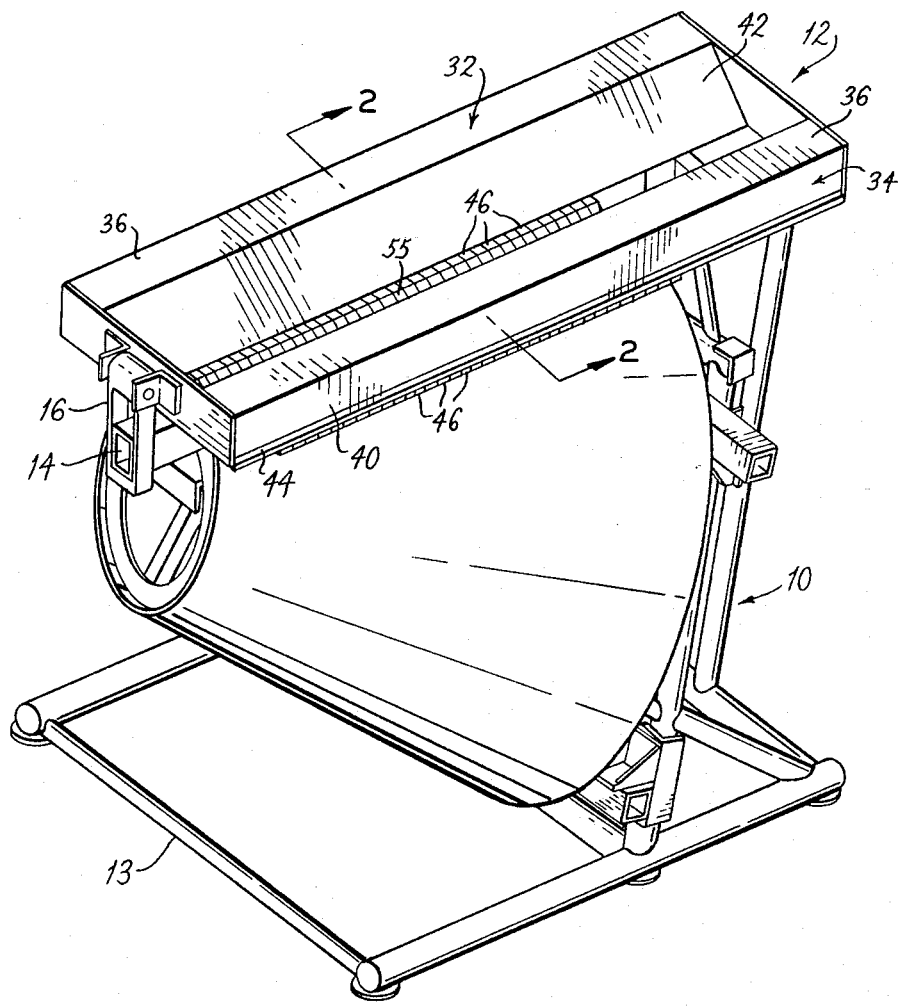
FIG. 1 is a perspective view from above showing an apparatus for welding together adjacent edges of abutting metal sheets, said apparatus being shown to illustrate a construction for welding a linear seam.
Figure 2:
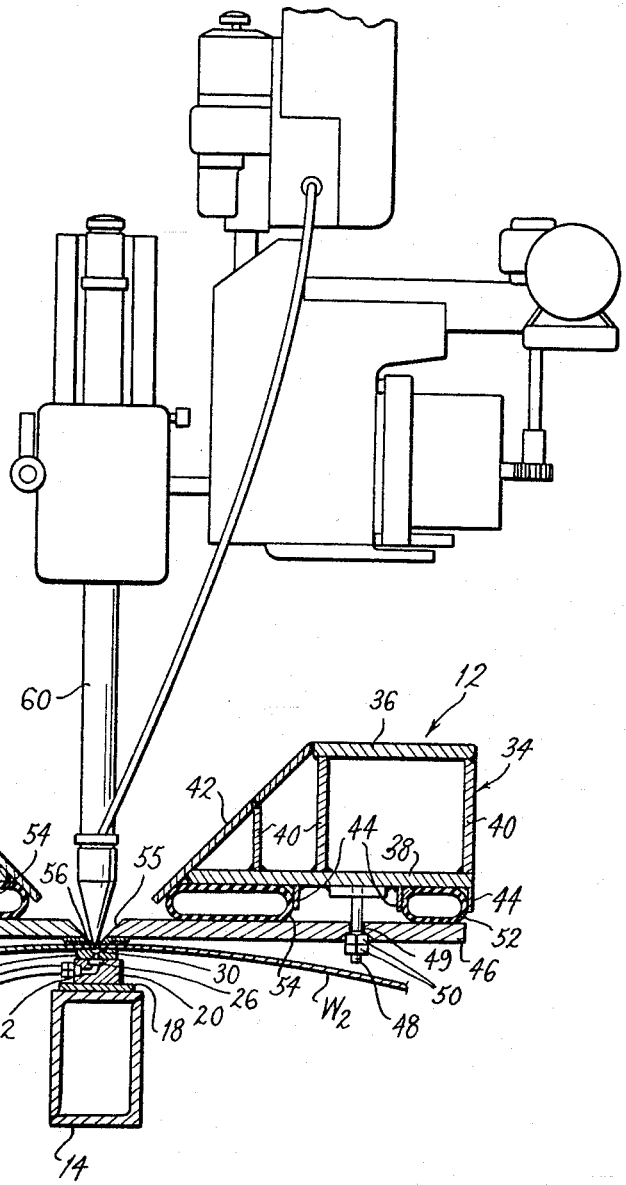
FIG. 2 is an enlarged fragmentary cross section view of the apparatus of FIG. 1 taken on line 2—2 thereof and showing a welding instrument in operative position thereabove.

Referring to FIGS. 1 and 2 there is shown means for supporting and welding together adjacent abutting edges of metal sheets $W_1$ and $W_2$ according to the present invention. The type of welding employed by the subject means and method is referred to as fusion butt welding, and takes place in an inert gas atmosphere. The apparatus for performing the welding is adaptable for manual and also for automatic operation. In order to produce strong smooth weld seams between adjacent sheets using the subject means and method, it is usually desirable and in some cases necessary to prepare the edges to be welded very carefully in advance, and means for so doing will be described hereinafter. It is also important in order to obtain smooth uniform thickness seams capable of withstanding relatively high pressures and abuse, that the areas being welded be in an extremely clean condition. The cleanliness of the members becomes even more important when the members being welded are relatively thin metal sheets.

The subject means and method have been successfully employed to weld together the edges of relatively thin sheets of titanium and other metals, some of which are relatively difficult to weld even under ideal conditions. For example, titanium sheets having thicknesses of .010 inch and even thinner have been welded together without requiring any filler material and the resulting seams have been tested for strength and durability under extreme conditions of pressure and without leaking, rupturing or otherwise weakening. In one particular application of welding titanium sheets, the edges to be welded are prepared in advance so that they have a maximum allowable gap or spacing therebetween when in abutment no greater than .004 inch. This means that each abutting edge must be accurately prepared to a tolerance of no greater than .002 inch. When so prepared and when welded by the present means and method without applying any filler material, the resulting seams are smooth, uniform thickness and are able to stand pressures approximately the pressures that can be withstood by the individual unwelded pieces without rupturing or leaking. Furthermore, seams of substantial lengths have been made using the present means and method. Still further, the subject means and method have been used to weld together linear as well as nonlinear abutting edges, and the subject means and method have been employed to make seams in the skin of devices such as missiles and space capsules where the skin must be able to withstand tremendous pressures and shocks without leaking or fracturing. It is not intended however, to limit the present invention to such applications and it is anticipated that the present means and method could also be used in many other situations where welded seams are required.

The device shown in FIGS. 1 and 2 includes a frame work 10 formed of connected members resting on a floor or other surface. A horizontal structure 12 is attached adjacent one of its ends to the top of the frame work 10 and extends outwardly therefrom as a cantilever over the base portion 13. A hollow rectangular support member 14 is hingedly connected to the frame work 10 below the structure 12. The free end of the member is supported on the structure 12 by a U-shaped member 16 which is hingedly connected to the associated edge thereof.

An elongated shield member 18 is mounted on the upper surface of the horizontal member 14, and another elongated member 20 is mounted on the shield 18 and is provided with a fitting 22 for connection to one end of a conduit 24. The opposite end of the conduit is connected to a source of inert gas. The member 20 has suitable passages therein which are connected to the fitting 22 and also an outlet passage 26 that extends through its upper surface. A strip 28 of copper or some other suitable heat conductive material is positioned on top of the member 20 and is provided with an elongated aperture also slot 30 therethrough which communicates with the outlet passage 26 in the member 20.

The members or sheets $W_1$ and $W_2$ are positioned with their abutting edges resting on the heat conductive strip 28 and over the slot 30 as shown in FIG. 2. In this position, the support member 14 is raised and supported in the aforementioned horizontal position by the U-shaped member 16. The overhead structure 12 now engages the upper surfaces of the sheets $W_1$ and $W_2$, as will be explained, and clamps them in the aforesaid position against the strip 28.

The overhead structure 12 is constructed of two similarly shaped parts 32 and 34 each of which includes an upper plate 36, a wider plate 38 therebelow, connecting vertical walls 40 welded therebetween, and a sloping wall 42 also connected between the plates 36 and 38. The sloping walls 42 on the two parts 32 and 34 are spaced from each other over the weld area and form an elongated trough or channel thereabove. The under surfaces of the wider plates 38 on each of the parts 32 and 34 has spaced downwardly extending walls 44, and the sloping wall 42 on each part also extends below the lower surface of the plates 38 as shown in FIG. 2. A plurality of finger members 46 are positioned below each of the plates 38 on each of the parts 32 and 34 and are connected to the associated plates 38 by threaded members 48. The threaded members 48 are fixedly connected to plates 38 and extend downwardly therefrom through slightly larger size openings or holes 49 in the fingers 46 thereby permitting some tilting movement of the fingers 46 relative to the plates 38. The threaded members are also provided with nuts 50 which are attached below the associated fingers 46 to prevent separation of the fingers 46 from the plates 38.

In the spaces formed between the plates 38 and the associated fingers 46 on opposite sides of the threaded members 48 and also between the downwardly extending members 42 and 44 are positioned flexible inflatable tubular members 52 and 54. The tubular members 52 are smaller than the members 54 and are positioned outwardly further from the weld location than the members 54. All four of the tubular members 52 and 54 on the parts 32 and 34 are inflated with air or some other suitable fluid. However, since the tubular members 54 are larger than tubular members 52 the ends of the fingers 46 adjacent to the weld seam will move downwardly pivoting about the nuts 50. In this way the finger 46 moves downwardly against the associated sheets $W_1$ and $W_2$ and clamp the sheets on the heat conductive member 28.

The ends of the fingers 46 adjacent to the weld seam are tapered or beveled at 55 to continue the downward sloping contour of the associated walls 42 and to provide room for a welding electrode to move adjacent to the seam. The undersides of the fingers 46 adjacent the weld seam are also provided with attached copper pieces 56 which are included to conduct heat away from the seam during welding. By providing a plurality of finger members 46 the clamping force is relatively uniformly distributed along the lengths of the members $W_1$ and $W_2$ and adjacent the edges to be butt welded and the clamping force can also be easily adjusted by simply changing the pressure in the tubes 52 and 54.

With the sheet supported and clamped in abutting position between the fingers 46 and the member 28, a welding instrument or electrode 60 (FIG. 2) is moved along and slightly above the abutting edge portions of the sheets at a uniform preselected rate depending upon the characteristics of the material being welded. While the electrode 60 moves along the weld, inert gas is fed through the conduit 24 and up through the aperture 30 to surround the area in which the welding is taking place to prevent corrosion and oxidation of the materials. At the same time the copper members 28 and 56, known as chill bars, are in contact with the sheets $W_1$ and $W_2$ to conduct away and dissipate the heat of welding. It should also be noted that the weld is accomplished by the electrode 60 without requiring the use of any filler material, although in some situations and with some metals it may be desirable to use a filler in which case the filler material can be provided in the form of a welding rod.

Figure 3:
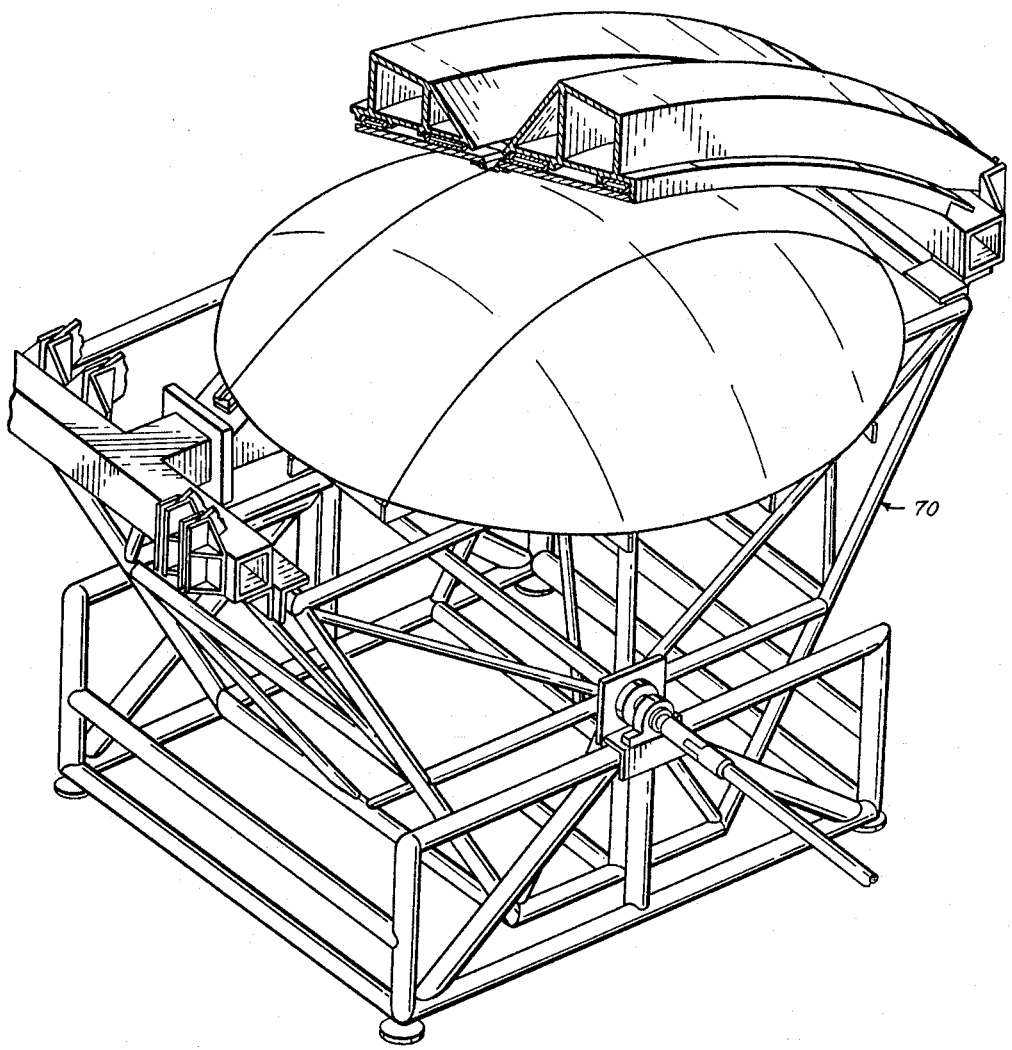
FIG. 3 shows a modified form of the machine of FIG. 1 specifically constructed for welding a non-linear seam.

FIG. 3 shows a modified form of the subject device specifically adapted for welding curved or nonlinear abutting edges of sheet members. In the modified form as shown the weld seam follows an arc of a circle and the welding head 60 remains fixed while the edges of the sheets to be welded are moved at a predetermined rate on the rotatable cradle structure 70. Except for the cradle structure 70 for moving and supporting the sheets and also the provision of a stationary instead of movable electrode the construction shown in FIG. 3 is substantially the same as the mechanism shown in FIGS. 1 and 2.

Figure 4:
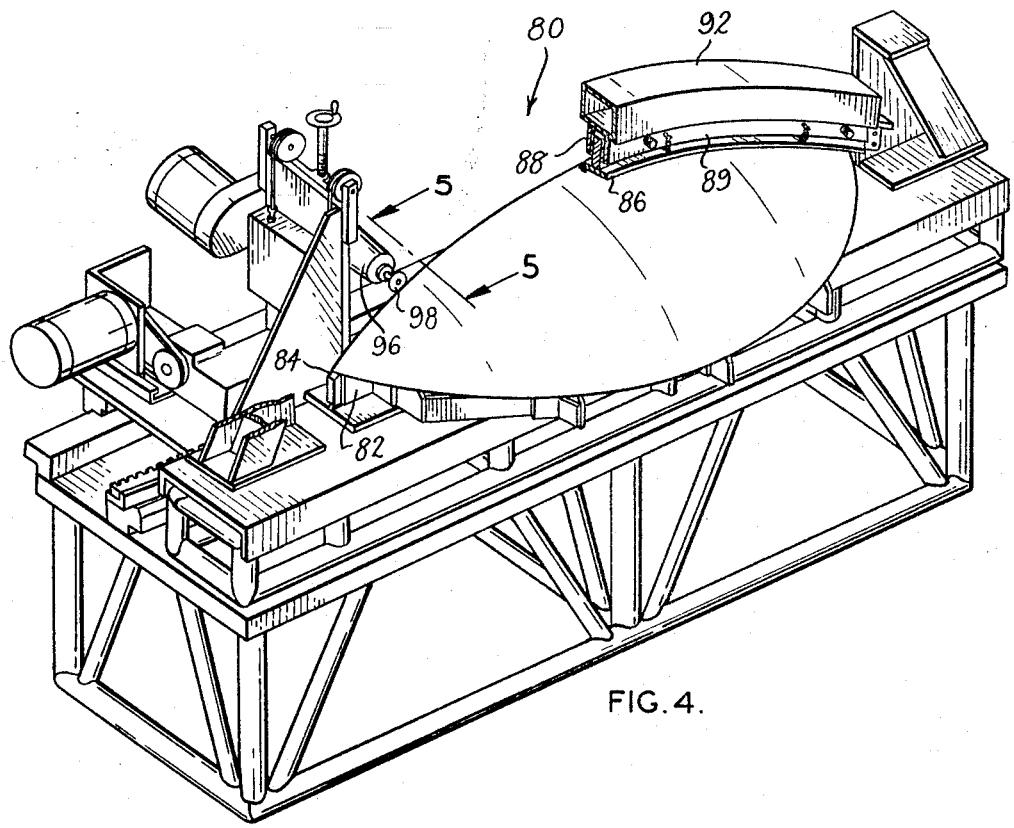
FIG. 4 is a perspective view showing a cutting or trimming machine used for preparing edges of sheets to be welded.
Figure 5:
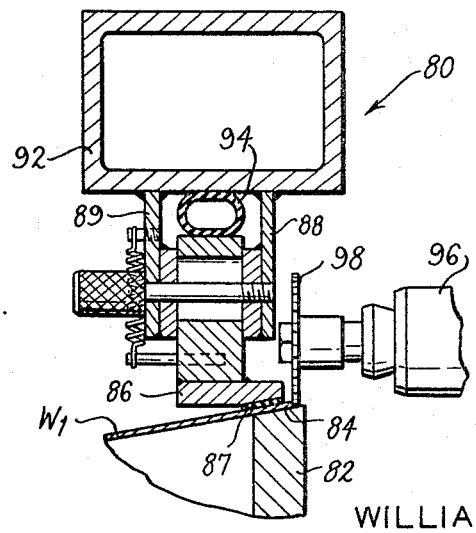
FIG. 5 is a fragmentary cross-sectional view of the trimming machine of FIG. 4 taken on line 5—5 thereof.

FIG. 4 shows a cutting tool 80 used to accurately prepare the edges of the sheets prior to welding. The tool 80 has a fixed member 82 with a suitably beveled upper surface 84 on which the work $W_1$ (or $W_2$) is positioned during trimming. The edge portion of the sheet $W_1$ is accurately positioned on the beveled surface 84 and is clamped in position thereon by a clamp member 86 which has a rubber or like pad 87 attached thereto. The clamp member 86 is vertically slidable between two spaced support members 88 and 89 which extend downwardly from an overhead support structure 92. Between the upper surface of the clamp member 86 and the lower surface of the overhead support structure 92 is positioned a flexible inflatable tubular member 94 which when inflated moves the clamp member 86 downwardly into clamping engagement with the upper surface of the sheet $W_1$. In this way the member 86 applies vertical force to clamp the sheet $W_1$ against the beveled surface 84. Also in this way the clamping force is relatively evenly distributed along the edge of the sheet $W_1$ and is adjustable in response to inflation of the member 94. It is also contemplated to use a plurality of finger members such as the fingers 46 in FIG. 2 instead of the single clamp member 86 if desired. With the sheet $W_1$ clamped firmly in position, a cutter tool 96 having a rotatable cutter member 98 is moved along the edge of the sheet being trimmed. If the edge to be trimmed is curvilinear instead of straight then it may be desirable to have the cutter tool 96 stationary and to move the sheet instead. Means for so doing, could be constructed along lines similar to the structure shown in FIG. 3.

It is now apparent that there has been disclosed novel means and method for making smooth uniform thickness butt welded seams for joining adjacent edges of metal sheets, which welds are constructed without requiring a filler material and which welds are able to withstand substantially the same amount of abuse and pressures as the individual sheets themselves. The subject welding means and methods are also particularly useful in the joining of relatively thin metal sheets which heretofore it has been necessary to join by overlapping and welding. The subject invention therefore fulfills all of the objects and advantages sought therefor. The subject invention also includes means for accurately preparing the edges of sheets to be welded together, means for positioning the said prepared sheet edges to be welded in abutment, means for supporting and holding said abutting sheet edges during welding including means for relatively evenly distributing the holding force along the said edges, means for moving a welding electrode or the like along the said abutting sheet edges to weld said edges together without requiring the use of a filler material, and means for creating an inert atmosphere around the said welding electrode. The invention also comprises a novel method of welding utilizing the means hereinabove set forth.

Many changes, modifications, and alterations of the subject device will become apparent to those skilled in the art after considering this specification in conjunction with the accompanying drawings. All such changes, modifications and alterations which do not depart from the spirit and scope of the invention are deemed covered by the invention which is limited only by the claims which follow.

What is claimed is:

1. Apparatus for fusion welding adjacent edges of thin weldable sheet material comprising a support member, heat condutive means disposed upon said support member and formed with an elongated recess separating surfaces for receiving the edges of sheet material to be welded, a plurality of clamping fingers cooperable with said receiving surfaces for the sheet material, each of said fingers having an end portion engageable upon the sheet material placed upon said receiving surfaces of said heat conductive means, fixed structure spaced from said heat conductive means and extending on each side thereof, a plurality of spaced threaded elements carried by said fixed structure in rows on opposite sides of said heat conductive means, each clamping finger pivotally engaging one of said threaded elements intermediate its end portions such that each finger is pivotally supported between its said end portions on a threaded element, opposed means to positively actuate said fingers including first inflatable members engaged upon said fingers between the threaded elements and said first mentioned end portions and second inflatable members engaged upon said fingers between said threaded elements and the opposite end portions, means for individually adjusting the position of each finger on its associated threaded element, and fusion welding means adjacent said fixed structure having an electrode projecting into welding position at the sheet material edges.

2. Apparatus for fusion welding of the abutting edges of weldable sheet material comprising spaced elongated support structures defining a gap therebetween in which the welding operation is performed, an elongated support member disposed between said structures in the gap therebetween, a plurality of pivot elements carried by each support structure in spaced array lengthwise of said support member, a clamp finger mounted on each pivot element with a clamp end over said elongated support member and an opposite end extending outwardly away from said support member, a first inflatable member positioned in each elongated support structure to engage said clamp fingers between said pivot elements and said clamp ends, a second inflatable member positioned in each elongated support structure to engage said clamp fingers adjacent said opposite ends thereof, means for inflating said first and second inflatable members to predeterminately position and load said fingers, a welding heat dissipating block carried on said elongated support member to receive the edges of sheet material to be welded, said first inflatable members serving to press said clamp ends of said clamp fingers upon the sheet material and said second inflatable members serving to remove said clamp ends from engaging the sheet material, heat dissipating elements carried at said clamp ends of each clamp finger, and means threadedly engageable with each pivot element operable to adjust the position of any of said clamp fingers independently of any others thereof.

3. Apparatus for fusion welding butted edges of weldable sheet material comprising an elongated support member having a surface or receiving the edge portions of sheet material to be welded, said support member being of heat condutive material and having a longitudinal recess in said surface dividing the same into two areas one on each side of said recess, a plurality of clamp fingers arranged in two groups lengthwise of said support member and with a group thereof on each side of said support member, threaded means independently supporting each clamp finger in each group for pivotal movement about an axis between the ends thereof, each threaded means adjusting the pivot axis of the associated clamp fingers independently of any others thereof, said groups of clamp fingers having sheet material engaging ends projecting toward each other in spaced relation over said divided areas of said sheet material receiving surface of said support member, inflatable means engaged with each group of clamp fingers on opposite sides of the axis of movement provided by said support means, certain of said inflatable means between said axis of movement and said sheet material engaging ends serving to press said clamp fingers upon sheet material to be welded and clamp the same on said divided areas and certain other of said inflatable means serving to move said clamp fingers away from clamping positions relative to said divided areas, and means connected into said support member supplying inert gas to said recess.

References Cited by the Examiner

UNITED STATES PATENTS

| | | | |
|---|---|---|---|
| 1,840,737 | 1/1932 | Peck | 219—161 |
| 2,685,629 | 8/1954 | Peck | 219—125 |
| 2,866,077 | 12/1958 | Morton et al. | 219—125 |
| 2,922,870 | 12/1960 | Collins et al. | 219—161 |
| 3,032,639 | 5/1962 | Nesmith | 219—161 X |

JOSEPH V. TRUHE, *Primary Examiner.*